(12) United States Patent
Galligan Davila et al.

(10) Patent No.: US 9,824,364 B2
(45) Date of Patent: Nov. 21, 2017

(54) REGULATORY INVENTORY AND REGULATORY CHANGE MANAGEMENT FRAMEWORK

(71) Applicant: BANK OF AMERICA CORPORATION, Charlotte, NC (US)

(72) Inventors: Kelly Ann Galligan Davila, Charlotte, NC (US); Ethan Thomas Moore, Belmont, NC (US); Richard Allen Snyder, Charlotte, NC (US); Jason Dane Dodge, Fort Mill, SC (US); Walter Eugene McRae, Rock Hill, SC (US); Srinivas Rapaka, Lawrenceville, NJ (US); Ryan Alexander LaPrade, McAdenville, NC (US)

(73) Assignee: Bank of America Corporation, Charlotte, NC (US)

( * ) Notice: Subject to any disclaimer, the term of this patent is extended or adjusted under 35 U.S.C. 154(b) by 298 days.

(21) Appl. No.: 14/595,803

(22) Filed: Jan. 13, 2015

(65) Prior Publication Data
US 2016/0203494 A1 Jul. 14, 2016

(51) Int. Cl.
G06Q 10/00 (2012.01)
G06Q 30/00 (2012.01)

(52) U.S. Cl.
CPC .................. G06Q 30/018 (2013.01)

(58) Field of Classification Search
USPC ......................................................... 705/28
See application file for complete search history.

(56) References Cited

U.S. PATENT DOCUMENTS

| | | | | |
|---|---|---|---|---|
| 6,912,502 B1* | 6/2005 | Buddle | ................. | G06Q 10/10 705/7.41 |
| 8,799,243 B1* | 8/2014 | Havlik | ............... | G06Q 10/0631 705/59 |
| 2002/0026339 A1* | 2/2002 | Frankland | .............. | C10G 65/04 705/7.12 |
| 2002/0143595 A1* | 10/2002 | Frank | .................... | G06Q 10/06 705/311 |
| 2004/0186758 A1* | 9/2004 | Halac | ............... | G06Q 10/06311 705/7.18 |
| 2005/0065941 A1* | 3/2005 | DeAngelis | ............. | G06Q 40/08 |
| 2005/0066021 A1* | 3/2005 | Megley | .................. | G06Q 10/06 709/223 |
| 2005/0071185 A1* | 3/2005 | Thompson | ........... | G06Q 30/018 705/317 |
| 2005/0187862 A1* | 8/2005 | Dheer | ............... | G06F 17/30899 705/39 |
| 2006/0047561 A1* | 3/2006 | Bolton | .................. | G06F 21/577 705/7.28 |
| 2007/0203718 A1* | 8/2007 | Merrifield | .......... | G06Q 10/0635 705/317 |

(Continued)

*Primary Examiner* — Ashford S Hayles
(74) *Attorney, Agent, or Firm* — Michael A. Springs; Moore & Van Allen PLLC; Peter B. Stewart

(57) ABSTRACT

A computer implemented method, implemented by an enterprise, of receiving regulatory change data from a feed, identifying a regulatory change, and communicating the regulatory change to an affected regulatory inventory associated with the enterprise. The method may also comprise of providing a questionnaire to a user, receiving questionnaire answers from a user, and creating a compliance action plan to assist the enterprise in managing the regulatory change.

12 Claims, 8 Drawing Sheets

(56) References Cited

U.S. PATENT DOCUMENTS

| | | | | |
|---|---|---|---|---|
| 2007/0226721 | A1* | 9/2007 | Laight | G06Q 10/06 717/154 |
| 2007/0288281 | A1* | 12/2007 | Gilbert | G06F 21/604 705/80 |
| 2008/0195463 | A1* | 8/2008 | Aggour | G06F 17/30867 705/35 |
| 2008/0270316 | A1* | 10/2008 | Guidotti | G06Q 40/02 705/36 R |
| 2008/0281768 | A1* | 11/2008 | Sadeh | G06Q 10/10 706/47 |
| 2009/0119141 | A1* | 5/2009 | McCalmont | G06Q 10/0637 705/7.41 |
| 2010/0235297 | A1* | 9/2010 | Mamorsky | G06Q 40/06 705/36 R |
| 2011/0145884 | A1* | 6/2011 | Rivers | G06F 21/40 726/1 |
| 2011/0209197 | A1* | 8/2011 | Sardanopoli | G06Q 40/04 726/1 |
| 2011/0258088 | A1* | 10/2011 | Padala | G06Q 40/02 705/30 |
| 2012/0311449 | A1* | 12/2012 | Harding | G06Q 10/00 715/730 |
| 2013/0246292 | A1* | 9/2013 | Dick | G06Q 10/00 705/317 |
| 2013/0325731 | A1* | 12/2013 | Guarnery | G06Q 30/018 705/317 |
| 2015/0262105 | A1* | 9/2015 | Jeffries | G06Q 10/06316 705/7.26 |

* cited by examiner

Regulatory Inventory Tool
401

Home | Administrator | Help | Contact ◄───── 403

Line of Business 3 ◄───── 402

Inventory: Line of Business 3 ◄───── 410

Inventory Table
420

| Citation | Standard Name | Action Plans | Issuing Authority |
|---|---|---|---|
| AAAA | Regulation Name 1 | Action Plan 1 | Authority 1 |
| BBBB | Regulation Name 2 | Action Plan 2 | Authority 1 |
| CCCC | Regulation Name 3 | Action Plan 3 | Authority 2 |
| DDDD | Statute Name 1 | Action Plan 4 | Authority 3 |
| EEEE | Statute Name 2 | Action Plan 5 | Authority 4 |
| FFFF | Rule Name 1 | Action Plan 6 | Authority 5 |
| GGGG | Rule Name 2 | Action Plan 7 | Authority 5 |

Regulatory Change Table
430

| Citation | Standard Name | Issuing Authority | Affected Inventories | Description | Effective Date |
|---|---|---|---|---|---|
| HHHH | Regulation Name 4 | Authority 1 | Line of Business 3 | ... | DD/MM/YYYY |
| IIII | Statute Name 3 | Authority 6 | Line of Business 3, Line of Business 6 | ... | DD/MM/YYYY |
| JJJJ | Rule Name 3 | Authority 7 | Line of Business 1, Line of Business 3 | ... | DD/MM/YYYY |

Regulatory Change User Interface 501

Home | Administrator | Regulatory Change | Action Steps | Help | Contact ◄─── 503

Regulatory Change XXXX ◄─── 502

Regulatory Change Overview 510

| | |
|---|---|
| Short Title | ZZZZ |
| Short Title Native Translation | ZZZ |
| Regulatory Change ID # | XXXX |
| Applicable to Enterprise? | Yes |

| Region Affected | Issuing Authority | Type of Issuance | Rule Citation | Standard Name | Native Language Name |
|---|---|---|---|---|---|
| Region 1 | Authority 1 | Final Rule | HHHH | ZZZZ | ZZZZ |

Regulatory Change Window 520

| Responses | Details | Impacts | Related Reg Chgs | Reg Chg History |
|---|---|---|---|---| xxxxx xxxx xxxxxx xxxxxx xx xxxxx xxx xxxx x xx
xxx xxxxxx xx xxxxxx xxxxx xxx xxxxx xxx xxxxx
xxx xxx xx xxxxxxxx xx xx x xxxxx xxxxx.

| | |
|---|---|
| Description: | n/a |
| Description Native Translation: | XXXX |
| Docket Number: | HHHH |
| Citation: | Final |
| Enterprise Issuance Category: | No |
| English Translation?: | No |
| Joint Issuance?: | |

Regulatory Change User Interface 501

Home | Administrator | Regulatory Change | Action Steps | Help | Contact ◀—— 503

Regulatory Change XXXXX ◀—— 502

Regulatory Change Overview  510

Short Title                          ZZZZ
Short Title Native Translation       ZZZZ
Regulatory Change ID #               XXXX
Applicable to Enterprise?            Yes Region Affected   Issuing Authority   Type of Issuance   Rule Citation   Standard Name   Native Language Name
Region 1          Authority 1         Final Rule         HHHH            ZZZZ            ZZZZ

Regulatory Change Window  520

| Responses | Details | Impacts | | Related Reg Chgs | Reg Chg History | |
|---|---|---|---|---|---|---|
| Impact Rating | Compliance Status | Inventory | | Date Created | Ant. Comp. Date | Response ID |
| High | On Target to Meet Deadline | Line of Business 1 | | DD/MM/YYYY | DD/MM/YYYY | AAAA |
| High | On Target to Meet Deadline | Line of Business 1 | | DD/MM/YYYY | DD/MM/YYYY | BBBB |
| Low | On Target to Meet Deadline | Line of Business 3 | | DD/MM/YYYY | DD/MM/YYYY | CCCC |
| Medium | On Target to Meet Deadline | Line of Business 4 | | DD/MM/YYYY | DD/MM/YYYY | DDDD |
| Medium | On Target to Meet Deadline | Line of Business 5 | | DD/MM/YYYY | DD/MM/YYYY | EEEE |

Questionnaire Interface  601

Home | Administrator | Help | Contact ◄——— 603

Compliance Action Plan XXXX ◄——— 602

Impact Assessment Rating  610

Compliance Status  620

| Framework Element | Question | Impact? | Related Data | Add Data | Selected Data | | |
|---|---|---|---|---|---|---|---|
| 12 Unanswered Questions Remaining | 12 of 12 Questions Displayed | Select All "Yes" | Select All "No" ◄——— 631 | | | | | | |
| Strategic Plan | Does a Strategic Plan need to be updated or created because of this regulatory change? | ○ Yes ○ No | N/A | N/A | N/A | Add Comment | Add Action Step |
| Regulatory Inventory | Does the Reg. Inventory need to be updated? | ○ Yes ○ No | XXXX | N/A | XXXX | Add Comment | Add Action Step |
| Policy | Does a Policy need to be updated? | ○ Yes ○ No | XXXX | Add | XXXX | Add Comment | Add Action Step |
| Monitoring | Does a Monitoring activity need to be updated or created? | ○ Yes ○ No | XXXX | Add | XXXX | Add Comment | Add Action Step |
| Testing | Does a Testing Activity need to be updated or created? | ○ Yes ○ No | XXXX | Add | XXXX | Add Comment | Add Action Step |

REGULATORY INVENTORY AND REGULATORY CHANGE MANAGEMENT FRAMEWORK

BACKGROUND

Achieving and maintaining compliance with laws, rules, and regulations can be challenging for enterprises with multiple lines of business, especially when each line of business is governed by different rules and those rules are subject to change. Manually parsing through changes to regulations is resource intensive, and may result in analysis of laws, rules, and regulations that are not applicable to every line of business. As such, a need exists to automatically provide a line of business within an enterprise with relevant regulatory changes, and to automate a process to help manage the regulatory changes across the enterprise.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Methods, systems, and computer program products are described herein that provide for an enterprise regulatory inventory management and regulatory change management.

In one embodiment, a system for managing regulatory inventory and regulatory change for an enterprise is provided. The system includes a computing platform comprising one or more processing devices and executable software code stored in one or more electronic storage devices, wherein the executable software code is configured to cause the one or more processing devices to receive regulatory change data from one or more electronic feeds within a distributed server network, wherein the electronic feeds monitor one or more issuing authorities. The executable software code is also configured to identify a regulatory change from the regulatory change data. The executable software code is also configured to identify a regulatory inventory potentially affected by the regulatory change. The executable software code is also configured to communicate the regulatory change to a user dashboard associated with the affected regulatory inventory. The executable software code is also configured to provide a questionnaire to the user dashboard, and subsequently receive a response to the questionnaire from a user. Finally, the executable software code may also be configured to create a compliance action plan for the regulatory change.

In some embodiments of the system, the executable software code is further configured to provide a compliance action plan interface to the user database, wherein the compliance action plan interface manages a compliance policy of the enterprise, with regard to the regulatory change.

In some embodiments of the system comprising executable software code configured to identify a regulatory change from the regulatory change data, the executable software code is further configured to identify the regulatory change based on a citation taxonomy of the regulatory change data, wherein the regulatory change citation data is matched to a citation taxonomy of one or more regulatory inventories.

Some embodiments of the system comprise executable software code that is configured to identify a regulatory inventory potentially affected by the regulatory change, wherein the regulatory inventory is a set of laws, rules, and regulations that are relevant to a particular line of business within the enterprise.

In some embodiments, the system comprising executable software code configured to identify a first regulatory inventory potentially affected by the regulatory change is further configured to identify at least a second regulatory inventory within the enterprise that is not affected by the regulatory change.

In some embodiments, the system comprising executable software code configured to communicate the regulatory change to a user dashboard associated with the first regulatory inventory is further configured to not communicate the regulatory change to at least a second user dashboard associated with a second regulatory inventory.

Another embodiment of the invention is a computer implemented method for managing regulatory inventory and regulatory change for an enterprise. In some embodiments, the computer implemented method comprises receiving, via a processing device, regulatory change data from one or more electronic feeds within a distributed server network, wherein the electronic feeds monitor one or more issuing authorities. In some embodiments, the computer implemented method comprises identifying, via a processing device, a regulatory change from the regulatory change data. In some embodiments, the computer implemented method comprises identifying, via a processing device, a regulatory inventory potentially affected by the regulatory change. In some embodiments, the computer implemented method comprises communicating, via a processing device, the regulatory change to a user dashboard associated with the affected regulatory inventory. In some embodiments, the computer implemented method comprises providing, via a processing device, a questionnaire to the user dashboard. In some embodiments, the computer implemented method comprises receiving, via a processing device, a response to the questionnaire from a user. Finally, in some embodiments, the computer implemented method comprises creating, via a processing device, a compliance action plan for the regulatory change.

In some embodiments of the computer implemented method, the computer implemented method further comprises providing, via a processing device, a compliance action plan interface to the user database, wherein the compliance action plan interface manages a compliance policy of the enterprise, with regard to the regulatory change.

In some embodiments, the computer implemented method comprising identifying a regulatory change from the regulatory change data further comprises identifying the regulatory change based a citation taxonomy of the regulatory change data, wherein the regulatory change citation data is matched to a citation taxonomy of one or more regulatory inventories.

In some embodiments of the computer implemented method, the computer implemented method comprises identifying, via a processing device, a regulatory inventory potentially affected by the regulatory change, wherein the regulatory inventory is a set of law, rules, and regulations that are relevant to a particular line of business within the enterprise.

In some embodiments, the computer implemented method comprising identifying, via a processing device, a first regulatory inventory potentially affected by the regulatory change is further configured to identify, via a processing device, at least a second regulatory inventory within the enterprise that is not affected by the regulatory change.

In some embodiments, the computer implemented method comprising communicating, via a processing device, the regulatory change to a user dashboard associated with the first regulatory inventory is further configured to not communicate the regulatory change to at least a second user dashboard associated with a second regulatory inventory.

In another embodiment, a computer program product for managing regulatory inventory and regulatory change for an enterprise is provided. The computer program product comprises a non-transitory computer readable medium comprising computer readable instructions. The computer readable instructions may include receiving regulatory change data from one or more electronic feeds within a distributed server network, wherein the electronic feeds monitor one or more issuing authorities. In some embodiments, the computer readable instructions comprise identifying a regulatory change from the regulatory change data. In some embodiments, the computer readable instructions comprise identifying a regulatory inventory potentially affected by the regulatory change. In some embodiments, the computer readable instructions comprise communicating the regulatory change to a user dashboard associated with the affected regulatory inventory. In some embodiments, the computer readable instructions comprise providing a questionnaire to the user dashboard. In some embodiments, the computer readable instructions comprise receiving a response to the questionnaire from a user. Finally, in some embodiments, the computer readable instructions comprise creating a compliance action plan for the regulatory change.

In some embodiments of the computer program product, the computer readable instructions comprise instructions for providing a compliance action plan interface to the user, wherein the compliance action plan interface manages a compliance policy of the enterprise, with regard to the regulatory change.

In some embodiments of the computer program product, the computer readable instructions for identifying a regulatory change from the regulatory change data further comprise instructions for identifying the regulatory change based on a citation taxonomy of the regulatory change data, wherein the regulatory change citation data is matched to a citation taxonomy of one or more regulatory inventories.

In some embodiments of the computer program product, the computer readable instructions comprise instructions for identifying a regulatory inventory potentially affected by the regulatory change, wherein the regulatory inventory is a set of laws, rules, and regulations that are relevant to a particular line of business within the enterprise.

In some embodiments of the computer program product, the computer readable instructions for identifying a first regulatory inventory potentially affected by the regulatory change further comprises instructions for identifying at least a second regulatory inventory within the enterprise that is not affected by the regulatory change.

Finally, in some embodiments of the computer program product, the computer readable instructions comprising instructions for communicating the regulatory change to a user dashboard associated with the first regulatory inventory further comprises instructions for not communicating the regulatory change to at least a second user dashboard associated with a second regulatory inventory.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
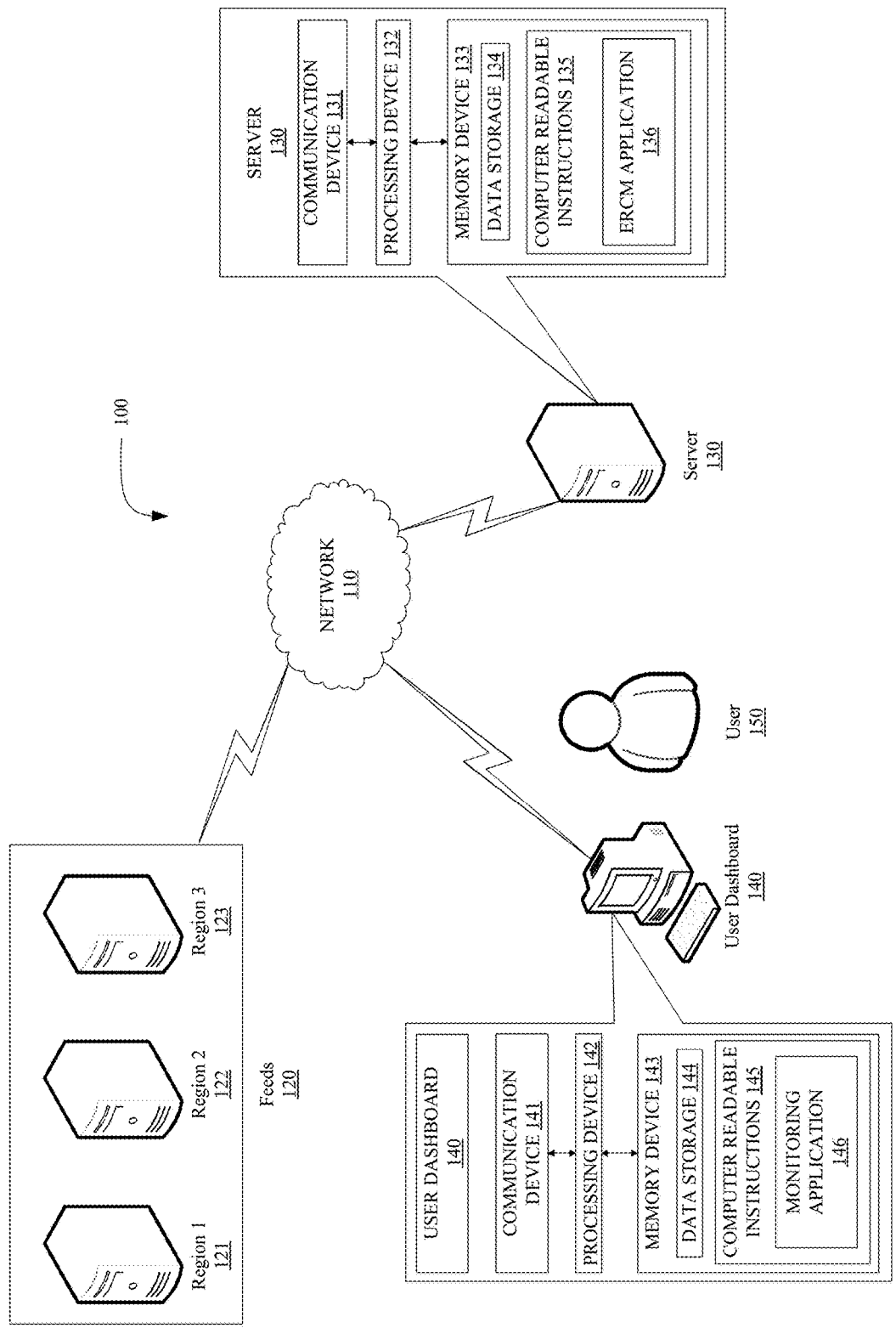
Figure 2:
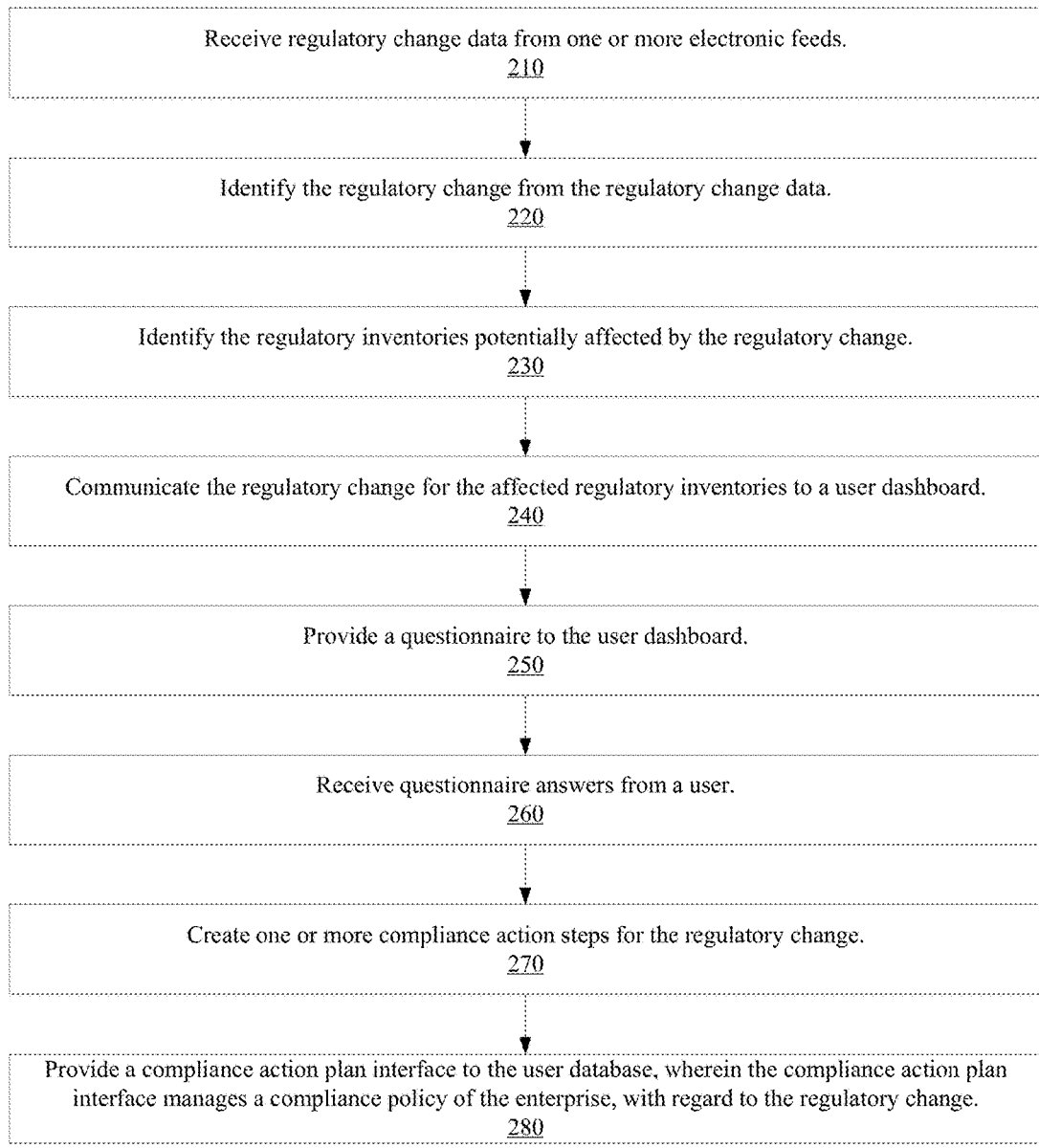
Figure 3:
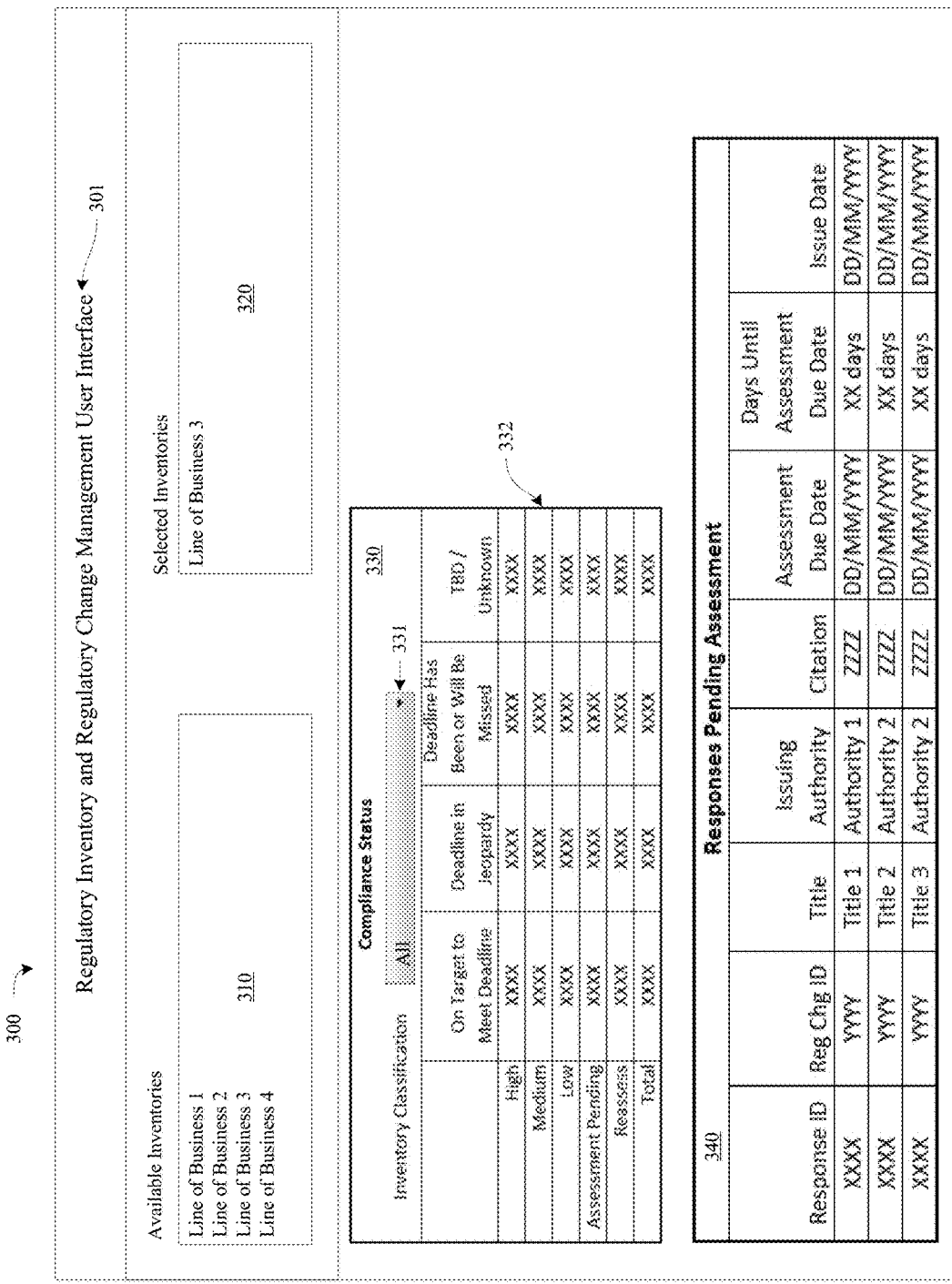
Figure 7:
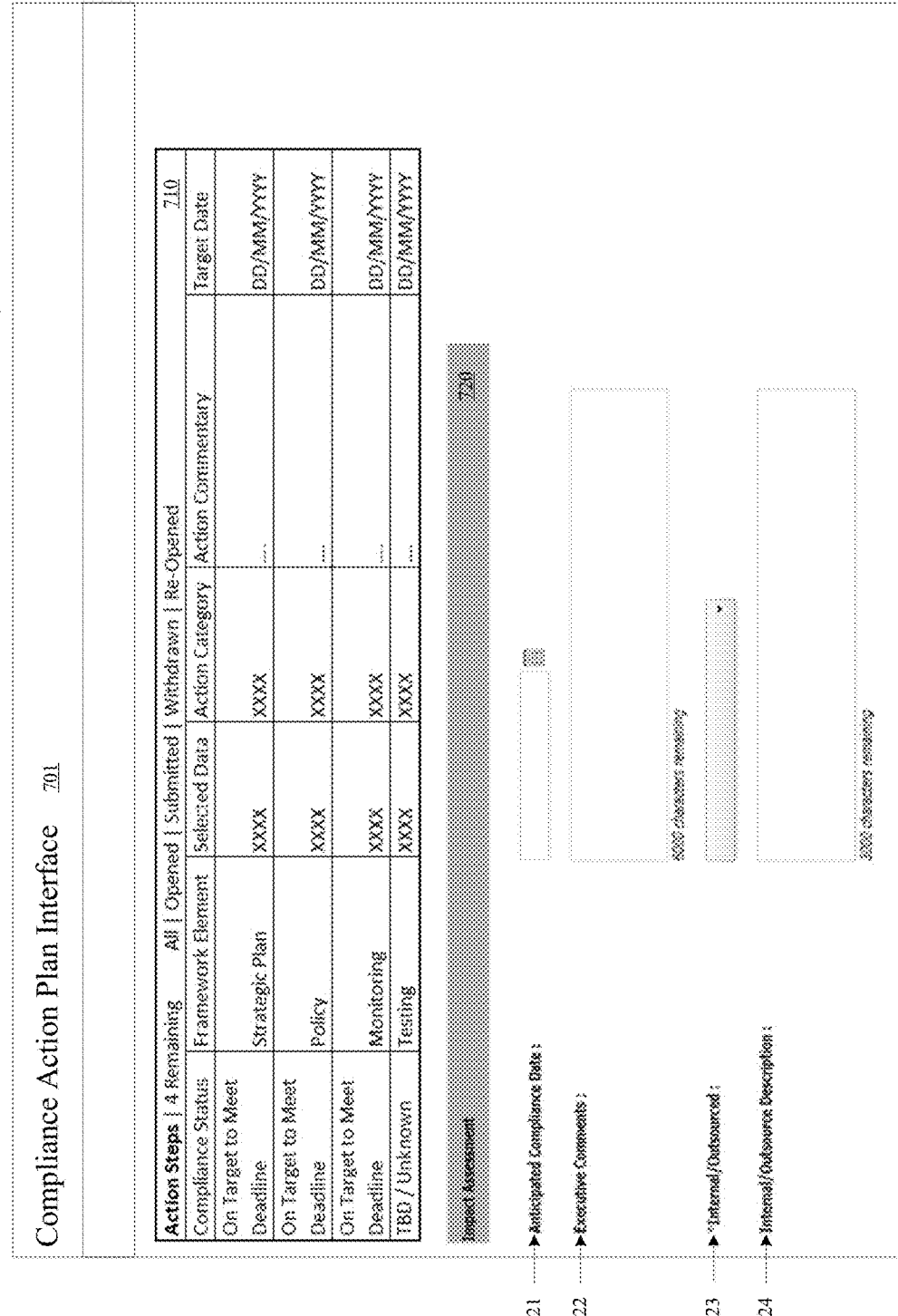

Having thus described embodiments of the invention in general terms, reference will now be made to the accompanying drawings, which are not necessarily drawn to scale, and wherein:

FIG. 1 is a block diagram illustrating an enterprise regulatory inventory and regulatory change management system, in accordance with an embodiment of the invention;

FIG. 2 is a flow chart illustrating an enterprise regulatory inventory and regulatory change management system, in accordance with an embodiment of the invention;

FIG. 3 is a sample display illustrating a user interface homepage, in accordance with embodiments of the present invention;

FIG. 4 is a sample display illustrating a regulatory inventory tool, in accordance with an embodiment of the invention;

FIG. 5A is a sample display illustrating a regulatory change user interface, in accordance with an embodiment of the invention;

FIG. 5B is a sample display illustrating a regulatory change user interface, in accordance with an embodiment of the invention;

FIG. 6 is a sample display illustrating a questionnaire interface, in accordance with an embodiment of the invention; and FIG. 7 is a sample display illustrating a compliance action plan interface, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

In some embodiments, an "enterprise" may refer to a business entity that is either operating within, or acting on behalf of an enterprise operating within, a regulatory environment and therefore requires regulatory change management to maintain compliance with the regulations. In some embodiments, an enterprise may be comprised of more than one line of business, with each line of business falling under different regulatory schemes and restrictions. For example, in exemplary embodiments, an enterprise may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and savings banks, savings and loan associations, credit unions, investment companies, insurance companies and the like. In some embodiments, the financial institution may be comprised of several different lines of business, each with distinct regulatory restrictions. As such, each line of business requires unique regulatory compliance review, and the current invention can provide such comprehensive regulatory compliance management.

Thus, systems, methods, and computer program products are described herein that provide for an enterprise regulatory inventory management and regulatory change management.

FIG. 1 illustrates an embodiment of a system 100 that may be utilized to manage regulatory change for one or more lines of business within an enterprise. As illustrated, the system 100 may include one or more feeds 120 that communicate with a network 110. The feeds 120 may comprise regulatory change data for one or more regions 121-123. As illustrated, the system 100 may further comprise a server 130 in communication with a user dashboard 140 and the feeds 120, connected via the network 110. In some embodiments, more than one server 130 may be used in the system 100. A user 150 may be associated with the user dashboard 140. Typically, such users 150 are technical personnel tasked with managing regulatory changes for an enterprise or specific line of business within an enterprise. Therefore, a user dashboard 140 may be associated with a particular line of business within the enterprise. In some embodiments, multiple users 150 and multiple user dashboards 140 are provided; each set of users 150 and their respective user dashboards 140 being associated with a particular line of business. As illustrated, the servers 130 and the user dashboard 140 each include a communication device 131 and 141, a processing device 132 and 142, a memory storage device 133 and 143, a data storage 134 and 144, and computer readable instructions 135 and 145.

As used with respect to the server 130 and user dashboard 140, a "communication device" 131 and 141 may generally include a modem, server, transceiver, and/or other device for communicating with other devices on a network. A "processing device" 132 and 142 may generally refer to a device or combination of devices having circuitry used for implementing the communication and/or logic functions of a particular system. For example, a processing device 132, 142 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more programs based on computer-executable program code thereof, which may be stored in a memory device 133, 143. As the phrase is used herein, a processing device may be "configured to" perform a certain function in a variety of ways, including, for example, particular computer-executable program code embodied in computer-readable medium, and/or by having one or more application-specific circuits perform the function. The processing device 132, 142 may be configured to use the communication device 131, 141 to transmit and/or receive data and/or commands to and/or from other devices within the network 110.

A "memory device" 133, 143 may generally refer to a device or combination of devices that store one or more forms of computer-readable media for storing data and/or computer-executable program code/instructions. For example, in one embodiment, the memory device 133, 143 may include any computer memory that provides an actual or virtual space to temporarily or permanently store data and/or commands provided to the processing device 132, 142 when it carries out its functions described herein. In one embodiment, the memory device 132 of the server 130 includes computer readable instructions 135 that include an Enterprise Regulatory Change Management (ERCM) Application 136 discussed more fully below. Furthermore, the memory device 142 of the user dashboard 140 includes computer readable instructions 145 that include a monitoring application 146 discussed more fully below. Additionally, in some embodiments, the memory device 133, 143 includes a data storage 134, 144 or database configured for storing information and/or data. In other embodiments, the data storage 134, 144, may be housed remotely from the server 130 and the user dashboard 140, and the server 130 and user dashboard 140 is in communication with the data storage 134, 144 across the network 110 and/or across some other communication link.

The network 110 may include a local area network (LAN), a wide area network (WAN), and/or a global area network (GAN). The network 110 may provide for wireline, wireless, or a combination of wireline and wireless communication between devices in the network. In some embodiments, the network 110 includes a wireless telephone network. In some embodiments, the network includes the Internet. In some embodiments, the network 110 includes an intranet. Furthermore, the network 110 may include a combination of an intranet and the Internet.

The ERCM Application 136 may be any type of application capable of receiving feed data, identifying regulatory changes, identifying regulatory inventories affected by the regulatory changes, and communicating with a user dashboard 140. Communicating with the user dashboard may comprise providing a questionnaire to the user dashboard, receiving questionnaire answers from the user dashboard, and providing a compliance action plan for a regulatory change.

The Monitoring Application 146 may be any type of application capable of receiving information about a regulatory change, communicating with a server 130, and providing user interfaces to a user 150. Providing user interfaces to a user 150 may comprise displaying information about a regulatory change, providing a questionnaire to the user 150, receiving the questionnaire answer from a user, and displaying a compliance action plan associated with the regulatory change.

FIG. 2 is a process flow 200 of a Regulatory Inventory and Regulatory Change Management system 100, in accordance with an embodiment of the invention. As illustrated by block 210, the system 100 receives regulatory change data from one or more electronic feeds 120 wherein the electronic feeds monitor one or more issuing authorities. A feed 120 may be one or more electronic data suppliers, in communication with the network 110. In some embodiments, a feed 120 is an electronic database that monitors multiple regulatory issuing agencies for regulatory changes. When a regulatory change is discovered, the feed may pull the regulatory change data and communicate the regulatory change data to the network in real time or near-real time. In such an embodiment, the network 110 may receive the regulatory change data from an issuing authority, via the feed, in real time, or near-real time. This automatic nature of the system 100 allows an enterprise to constantly update and maintain its regulatory inventories with the most up-to-date regulatory change data available. It also allows an enterprise to begin its analysis of a regulatory change and develop an appropriate compliance action plan to address the regulatory change at an earlier point in time than the enterprise could without the real time electronic data feed. The feed 120 may be maintained by an entity that is separate from the enterprise. In some embodiments, multiple feeds provide data related to separate regions. For example, the region 1 feed 121 may provide data related to Region 1, the Region 2 feed 122 may provide data related to Region 2, and the region 3 feed 123, may provide data related to Region 3. In other embodiments, a single feed 120 may provide data related to all regions. In some embodiments, the network 110 reaches out to the feed 120 to communicate and receive data. In some embodiments, the feed 120 and the network 110 are connected such that the feed 120 automatically sends data to the network 110 on a continuous or periodic basis. For example, the feed 120 may send data to the network 110 on a daily basis. In some embodiments, the feed is one or more electronic databases that store regulatory change data and the network 110 monitors the feed in real time, or near real time, for new regulatory change data. When the regulatory change data is discovered, the network 110 then pulls the regulatory change data from the feed and distributes the regulatory change data throughout the system 100. In some embodiments, the data communicated to the network 110 by the feed 120 is regulatory change data. Regulatory change data is data containing or describing changes to existing laws, rules, regulations, as well as the identification of new laws, rules and regulations. In some embodiments, these laws, rules, and regulations may pertain to financial services, data security, contracts, employment, or specific lines of business within an enterprise. The regulatory change data may be created by an issuing authority. An issuing authority may be a rule maker, regulator, agency, body, organization, standard setter, or similarly responsible organization, including legal authorities, regional rule making bodies, and legal authorities or courts. In some embodiments, the issuing authority may provide a feed 120 of regulatory change data directly to the network 110. In other embodiments, a third party, or external vendor, may collect the regulatory change data from one or more issuing authorities and then provide a feed 120 containing the regulatory change data to the network 110.

As illustrated by block 220, the system 100 then identifies the regulatory change. In some embodiments, more than one regulatory change has taken place and each change has been delivered to the network via the feed. In such an embodiment, the system identifies each regulatory change. Again, a regulatory change may be a change to existing laws, rules, and regulations or the identification of new laws, rules, and regulations. Identifying the regulatory change comprises determining the issuing authority, the rule citation, the standard name of the rule, the region affected by the rule, and the new or changed text of the rule. This determination may be completed using logical sequencing based on the taxonomy of feed data. For example, the feed may provide a dataset containing a rule citation that matches the taxonomy expected by the system 100. In such a case, the system 100 registers that the regulatory change dataset is a rule from a specific source, and then the system 100 can discern what the standard name of the rule is, who the issuing authority is, and what the new or changed language of the rule is. The enterprise may keep the rule citation taxonomy uniform throughout every line of business within the enterprise. In some embodiments, each line of business uses different rule citation taxonomies. In such embodiments, the system 100 may match the regulatory change citation to the taxonomies of each individual line of business. By matching the regulatory change data citation taxonomy to the taxonomy of each individual line of business, the system 100 allows a line of business to set up inventory classifications, described below, using the preferred taxonomy of that line of business. In some embodiments, a regulation change ID is assigned to each regulation change for referencing and maintenance purposes within the enterprise.

As illustrated by block 230, once the system 100 has identified the regulatory change, the system 100 then identifies the regulatory inventories potentially affected by the regulatory change. A regulatory inventory is an inventory of laws, rules, and regulations that may affect a particular line of business. Since one line of business within an enterprise may be subject to different laws, rules, and regulations than a different line of business within the same enterprise, each line of business may have its own specialized regulatory inventory. Because of these differences in compliance scope coverage, a unique inventory classification may be given to each line of business within the enterprise. An inventory classification may be a set of directives pertaining to which regulatory changes may be relevant to a specific regulatory inventory. These directives may be general instructions such as "regulatory changes involving Region 1" or "regulatory changes involving the XYZ Act." The directives may also be more specific instructions such as "regulatory changes to XX U.S.C. XXX(a)" or "regulatory changes containing the keyword XXXX." Of course, such directives may be more or less specific, and may be used in combination with one another.

The use of inventory classification and the process step 230 will be illustrated in the following example: The system 100 has already identified the regulatory change to be concerning the statute YY U.S.C. ZZZ for Region 2. The enterprise includes a regulatory inventory for a first line of business, which contains an inventory classification of "regulatory changes involving Region 1 or statute YY U.S.C. WWW." The enterprise also includes a regulatory inventory for a second line of business, which contains an inventory classification of "regulatory changes involving Region 2 or statute YY U.S.C. VVV." Since the regulatory inventory for the second line of business has an inventory classification that covers regulatory changes involving Region 2, the system will identify the regulatory inventory for the second line of business as being affected by the current regulatory change.

The inventory classifications may be created by one or more users affiliated with the enterprise and having knowledge of the specific line of business associated with each regulatory inventory. In some embodiments of the invention, a regulatory inventory may be created for each line of business and a list of all relevant laws, rules, and regulations pertaining to the line of business are pre-populated into the regulatory inventory. In other embodiments, the regulatory inventory may originally be empty, and the regulatory inventory is only populated when the system 100 identifies that regulatory inventory as being potentially affected by a new regulatory change, based on the inventory classification. Of course, the regulatory inventory and the inventory classification for each line of business may be changed at any point, so that an enterprise may keep up to date with any changes to the overall structure of the regulations or to include any new Acts, treaties, court cases, or the like.

By automatically filtering each regulatory change through inventory classifications, an enterprise may save significant time and resources in compliance management because each regulatory change is sent only to the lines of business most likely affected by the change. No time is wasted by human employees parsing through each new regulation to determine if it may affect their particular line of business. Instead, the employees are presented with a list of regulatory changes that match their pre-determined rules for relevance regarding their specific line of business, as discussed next.

As illustrated by block 240, the system 100 then communicates the regulatory change for the affected regulatory inventory to a user dashboard 140. The user dashboard 140 may be accessed by a user 150 that has knowledge of the line of business affected by the regulatory change. In one embodiment where one regulatory change may impact more than one line of business within the enterprise, the system may communicate the regulatory change to more than one user dashboard, where each user dashboard is associated with a distinct line of business. In other embodiments where one regulatory change may impact more than one line of business, more than one user may access a single user dashboard 140.

As illustrated by block 250, the system then provides a questionnaire to the user dashboard. This questionnaire may be pre-populated with questions directed to how the regulatory change may affect the line of business. This questionnaire step allows the system 100 to further filter out irrelevant regulation changes, narrow down the impact a relevant regulation change will have on the line of business, and help to establish the action steps necessary to achieve or maintain compliance with the regulation change. The questionnaire may change between lines of business, but the task of each questionnaire is to ask a user 150 whether aspects of a line of business, such as processes, controls, policies, monitoring activities, testing activities, and the like, are affected by the regulatory change, and whether changes need to be made to those affected aspects. The questionnaire may also provide one or more sections that allow a user 150 to provide analysis or feedback regarding the regulatory change, so that other users or an administrator may have a better understanding of the regulatory change and potential issues that the regulatory change raises.

The system 100 may pull information from the regulatory inventory or other databases within its network 110, including the Internet and any intranet, and communicate this information to the user dashboard 140 so that the user 150 may have all necessary information available to assist in responding to the questionnaire.

In some embodiments of the invention, the questionnaire may provide selectable answers for each question. Questions may be simple "Yes/No" questions such as "Does Process 1 need to be updated because of this regulatory change?: Y/N." The questions may also allow for a "rating" response, such as "What is the Impact Assessment Rating?: High/Medium/Low." Some questions may include a dropdown list of pre-populated responses, selectable by the user 150. Some questions may provide a comment section for non-scripted responses by the user 150.

As illustrated by block 260, the system 100 receives the user's 150 responses to the questionnaire. The responses may be stored within the data storage 144 of the user dashboard 140, or in the memory storage 134 of a server 130.

As illustrated by block 270, the system 100 then creates a compliance action plan comprising one or more action steps for the regulatory change. The action steps are designed to aid the enterprise in its process of achieving or maintaining compliance with the regulatory change. An action step is a remedial task to be performed by an employee of the enterprise, or by an independent contractor, on behalf of the enterprise. Completing all of the action steps closes out the compliance action plan, and means that the regulatory change is accounted for within the line of business. Examples of action steps include "Create a new testing policy for System AAA to account for the regulatory change," "Adjust Policy BBB to account for the regulatory change." The action steps may be derived from the questionnaires discussed in blocks 250 and 260, so a strong set of action steps may depend on in-depth, detailed questions and responses to the questionnaire.

In some embodiments, the system 100 automatically assigns an action step to an employee of the enterprise who normally takes on similar tasks. This assignment may be made based on job title, job description, work load, or any other pre-set assignment rule.

As illustrated in block 280, the system 100 then provides an organized user interface at the user dashboard 140 so that a user 150 and/or administrator may keep track of the compliance action plans and better manage the enterprise's compliance, with regard to each regulatory change. In some embodiments, the system 100 creates all action steps within the action plan. In other embodiments, the system 100 creates some, or none of the action steps for the action plan. In some embodiments, a user 150 may add or remove action steps to or from the action plan.

In some embodiments, the system 100 may receive a notice from a user 150 that an action step is completed. In such an embodiment, the system 100 may automatically close the action step so that the enterprise will know that no further action is necessary regarding that action step. Once all action steps are closed, the system 100 may automatically close the compliance action plan, indicating that the enterprise is, or will become, compliant with the regulatory change.

FIG. 3 is an example screenshot of a regulatory inventory and regulatory change management user interface homepage 300 that may be provided by the system 100. The user interface includes a title 301, a list of available inventories 310, a list of selected inventories 320, a compliance status window 330, and a responses pending assessment window 340. The list of available inventories 310, as shown, includes the inventories for Line of Business 1, Line of Business 2, Line of Business 3, and Line of Business 4. The list of selected inventories 320, as shown, includes Line of Business 3. Since Line of Business 3 is the selected inventory, the user interface homepage 300 is populated with regulatory inventory and regulatory change data that pertains to Line of Business 3.

The compliance status window 330 may include an inventory classification dropdown menu 331, and a compliance status table 332 displaying the compliance status for all regulatory changes (and the respective compliance action plans) associated with the selected inventory classification. Example elements of the inventory classification dropdown menu include "all" (includes all inventory classifications within the selected inventory), "Region 1," "Region 2," "Process 1," "Process 2," and the like.

The compliance status table 332 may organize the compliance status of the compliance action plans into rows based on the impact rating of the respective regulatory change. The impact ratings shown in FIG. 3 include "High," "Medium," "Low," "Assessment Pending," "Needs Reassessment," and "Total," though other impact ratings may be used. The compliance status table 332 may also organize the compliance action plans into columns based on the timeline status of the compliance action plan. The timeline statuses shown in FIG. 3 include "On Target to Meet Deadline, "Deadline in Jeopardy," "Deadline Has Been or Will Be Missed," and "TBD/Unknown," though other timeline statuses may be used.

The responses pending assessment window 340 may list the regulatory changes identified by the system 100 as potentially affecting the line of business selected (Line of Business 3, in the illustration). The regulatory changes may be organized by "Compliance Action Plan ID" (an identification number given to the compliance action plan), "Regulatory Change ID," "Title," "Issuing Authority," "Citation," "Assessment Due Date," "Days Until Assessment Due Date," "and Issue Date," though other elements may be used to organize the pending assessments to a regulatory change.

An example screenshot of the regulatory inventory tool 400 is illustrated in FIG. 4. The regulatory inventory tool 400 may include a title 401, subtitle 402, navigation bar 403, inventory dropdown menu 410, an inventory table 420, and a regulatory change table 430. The subtitle 402 may be the name of the inventory currently being reviewed. The navigation bar 403 may include links to a home page, links to administrators, a help link, a contact link, and the like. The inventory dropdown menu 410 may include a list of all inventories that the user 150 may want to access. As shown in FIG. 4, the line of business selected in the inventory dropdown menu 410 determines which inventory information populates the inventory table: since Line of Business 3 is selected in the inventory dropdown menu 410, the inventory table 420 is populated with information about the inventory associated with Line of Business 3.

The inventory table 420 may list all relevant laws, rules, and regulations associated with Line of Business 3 (or whichever line of business is selected in the inventory dropdown menu 410). This list may be organized by citation, rule standard name, associated action plans, issuing authority, and other descriptive information for the laws, rules, and regulations. The inventory table 420 may be filtered or searched so a user 150 may easily find relevant regulatory information regarding an aspect of their line of business. The inventory table 420 may include links that allow a user 150 to print or export, to an external spreadsheet application, all or part of the inventory table information, for further analysis and record keeping purposes.

The regulatory change table 430 may list the regulatory changes or additions to the regulatory inventory of the selected line of business (here, Line of Business 3). The regulatory change table 430 may include the same information as the inventory table, as well as a brief description of the regulatory change, an effective date of the regulatory change, and affected inventories. The regulatory change table 430 may include links that allow a user 150 to print or export, to an external spreadsheet application, all or part of the regulatory change table, for further analysis and record keeping purposes.

FIG. 5A and FIG. 5B illustrate screenshots of a regulatory change user interface 500. The general layout of a regulatory change user interface 500, as depicted, may include a title 501, a subtitle 502, a navigation bar 503, a regulatory change overview 510, and a regulatory change window 520. The title 501 may indicate that the user 150 is viewing a regulatory change user interface 500. The subtitle 502 may be the regulatory change ID given to the regulatory change by either the system 100 or a user 150. The navigation bar 503 may provide links to the user 150 that allow the user to return to the homepage 300, see all regulatory changes, see the action steps pertaining to the current regulatory change, and contact an administrator. The regulatory change overview 510 may provide a short title for the regulatory change, a short title in the native language, the regulatory change ID, whether the regulatory change is applicable to the enterprise, the region affected by the regulatory change, the issuing authority, the type of issuance, the rule citation, the standard name for the rule citation, and the rule citation in the native language, though other elements may be added to provide a more comprehensive overview of the regulatory change.

The regulatory change window 520 may comprise of multiple tabs 521 that each contain information regarding the regulatory change at issue. As illustrated in the example screenshots, these tabs 521 may include "Responses," "Details," "Impacts," "Related Regulatory Changes," and "Regulatory Change History," though these are merely exemplary and other tabs may be used as well. The regulatory change window 520 may include links that allow a user to print some or all of the information on the screen, or to export some or all of a dataset to an external spreadsheet application.

FIG. 5A illustrates an example screenshot of a regulatory change user interface 500, with the "Details" tab selected in the regulatory change window 520. The "Details" tab may give an in-depth view of a selected regulatory change, with information being pulled from the feed, the questionnaire, and a regulatory inventory associated with the affected line of business. The information provided under the "Details" tab may include a full description of the regulatory change, the native language description of the regulatory change, a docket number, a citation for the regulatory change, an enterprise issuance category, and details about whether the regulatory change requires English translation, or was issued jointly with other laws. This description may help a user answer the questionnaire and better analyze the regulatory change and its impact on specific lines of business within the enterprise.

FIG. 5B illustrates an example screenshot of a regulatory change user interface 500 with the "Responses" tab selected in the regulatory change window 520. The "Responses" tab may list the compliance action plans for each line of business affected by the regulatory change. As illustrated in FIG. 5B, the regulatory change user interface 500 may organize the compliance action plans based on impact rating, compliance status, regulatory inventory, date created, anticipated completion date, and response ID (created either by the system 100 or a user 150 when the user completes the questionnaire and the compliance action plan is created). Of course, these are merely examples of compliance action plan characteristics that may be used for organizational purposes and other characteristics may be used as well.

FIG. 6 illustrates a screenshot of a questionnaire interface 600, according to one embodiment of the invention. The questionnaire interface 600 may comprise a title 601, a subtitle 602, a navigation bar 603, an impact assessment rating dropdown menu 610, a compliance status dropdown menu 620, and a list of compliance impact assessment questions 630. The title 601 may indicate to a user 150 that the user 150 is viewing the questionnaire interface 600. The subtitle 602 may be the title, ID number, or record number of the compliance action plan, which may not be fully created yet. Note that the terms "compliance action plan" and "inventory response" are synonymous, and any reference to a response to a regulatory change is equivalent to a compliance action plan. The impact assessment rating 610, the compliance status 620, and the compliance impact assessment questions 630, together, comprise the questionnaire discussed in process flow 200.

The impact assessment rating dropdown menu 610 allows a user 150 to select the appropriate impact rating for the regulatory change, relative to the specific line of business and its regulatory inventory that is being analyzed. Examples of impact ratings for the regulatory change include "High," "Medium," "Low," "Assessment Pending" (to be used when the user 150 needs more information before making a decision), "Reassess" (to be used when an error may have occurred or new changes may have affected a previous determination), and the like. As described earlier, the user 150 may reach the impact assessment decision based on the information provided in the regulatory change user interface 500, the answers to the impact assessment questions 630, and the user's 150 own knowledge and skill regarding the line of business being analyzed.

The compliance status dropdown menu 620 allows a user 150 to select the appropriate compliance status for achieving compliance within the analyzed line of business for the regulatory change at issue. Examples of a compliance status include "On Target to Meet Deadline," "Deadline in Jeopardy," "Deadline Has Been or Will Be Missed," "TBD/Unknown" (to be used when the user 150 needs more information before making a decision), and the like. The user 150 may reach the compliance status determination based on the information provided in the regulatory change user interface 500, the answers to the impact assessment questions 630, and the user's 150 own knowledge and skill regarding the line of business being analyzed.

The compliance impact assessment questions 630 may be presented in list-form, as illustrated in FIG. 6. A header 631 may describe how many questions out of the total number of questions remain, and provide links that a user may select to answer "Yes" or "No" to all applicable questions. The compliance impact assessment questions 630 may be organized by the categories of "Framework Element" (an aspect of the line of business), "Question," "Impact?," "Related Data," "Add Data," "Selected Data," "Add Comment," and "Add Action Step," among other potential categories. As illustrated in FIG. 6, the "Framework Elements" may include "Strategic Plan," "Regulatory Inventory," "Policy," "Monitoring," "Testing," among other potential aspects of a line of business. The "Questions" may be general questions such as "Does a Strategic Plan need to be updated or created because of this regulatory change?" but the questions could also be more specific and ask for analysis of a particular component of the framework element. The "Impact" may be a general "yes" or "no" selectable response, as illustrated, but a more detailed response may be used as well. The "Related Data" column may provide relevant data concerning the regulatory change and/or the particular line of business. The "Add Data" may provide a link or comment space to allow a user 150 to add relevant data to the compliance impact assessment questions 630. The "Selected Data" column may provide a list of data currently selected for review by the user 150. The "Add Comment" column may provide a link or comment space to allow a user 150 to attach a comment to the questionnaire for future reference. The "Add Action Step" column may provide a link or comment space for the user 150 to create an action step that will become a part of the compliance action plan for the line of business associated with the regulatory change. The system 100 may require all questions within the questionnaire 610-630 to be completed by the user 150 before the system 100 will receiving the questionnaire answers and begin to create a compliance action plan for the regulatory change.

FIG. 7 illustrates a sample display of a compliance action plan interface 700, according to one embodiment of the invention. The compliance action plan interface 700, as illustrated, includes a title 701, an action step list 710, and an impact assessment section 720. The title 701 may indicate to a user 150 that the user 150 is viewing a compliance action plan interface. The action step list 710 may be populated with every action step that comprises the compliance action plan. The action step list 710 may be organized with the following columns: "Compliance Status," "Framework Element," "Selected Data," "Action Category," "Action Commentary," and "Target Date," though other columns may be provided as well. The action step list 710 may also have a link that removes an action step from the action step list 710, when selected. The terms that populate the "Compliance Status" column may include "On Target to Meet Deadline," "Deadline in Jeopardy," "Deadline Has Been or Will Be Missed," and "TBD/Unknown." The "Framework Elements" may include "Strategic Plan," "Regulatory Inventory," "Policy," "Monitoring," "Testing," among other potential aspects of a line of business. The "Selected Data" may be data that was previously selected by the user 150 when filling out the questionnaire, and may aid the enterprise in completing the action step. The "Action Category" may be a type of action step regarding the framework element, such as "Review," "Create New," "Reconfigure," "Issue Memo," and the like. The "Action Commentary" may be a description of the action step that details and/or clarifies the actions necessary to satisfy the action step. This "Action Commentary" may be automatically populated with pre-programed language by the system 100, or may be populated by a user 150 during the questionnaire stage. The "Target Date" is the date set by either the system 100 or a user 150 by which the action step should be completed in order for the compliance action plan to be completed by or before the regulatory change goes into effect. This date may be changed depending on when other action steps are completed. As action steps are completed, the system (or a user 150) may remove the action steps from the compliance action plan. In some embodiments, the action steps are left in the action step list 710 so that a user 150 or administrator may review which steps are complete.

The impact assessment section 720 may be comprised of an Anticipated Compliance Date 721, Executive Comments 722, an Internal/Outsource dropdown menu 723, and an Internal/Outsource Description 724. The Anticipated Compliance Date 721 is the date by which the compliance action plan is expected to be completed. This date may be automatically assigned by the system 100 by determining when the final action step is scheduled to be completed, or a user 150 may assign this date. The Executive Comments 722 may be comments by a user 150, an administrator, or anyone associated with the enterprise and may provide instructions, clarification, or notes about the compliance action plan. The Internal/Outsource dropdown menu indicates whether the compliance action plan will be completed internally or if it should be (or already is) outsourced to an external party. The Internal/Outsource Description provides instructions, clarifications, or notes about the internal/outsourced nature of the compliance action plan.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing regulatory inventory and regulatory change for an enterprise, said comprising:
    a computing platform comprising one or more processing devices and executable software code stored in one or more electronic storage devices, wherein the executable software code is configured to cause the one or more processing devices to:
    monitor, at a managing server, regulatory change data from one or more electronic feeds within a distributed server network, wherein the electronic feeds monitor one or more issuing authorities, and wherein the one or more electronic feeds are transmitted from one or more remote servers in at least one geographic region that is separate from the managing server;
    identify a regulatory change from the regulatory change data based on a citation taxonomy of the regulatory change data, wherein the regulatory change data is matched to a citation taxonomy of one or more regulatory inventories;
    identify a regulatory inventory of the one or more regulatory inventories, wherein the regulatory inventory is affected by the regulatory change, and wherein the regulatory inventory is a set of laws, rules, and regulations that are relevant to a particular line of business within the enterprise;
    communicate the regulatory change to a user dashboard associated with the identified regulatory inventory;
    provide a questionnaire to the user dashboard, wherein the questionnaire comprises queries regarding whether processes, controls, policies, monitoring activities, or testing activities are affected by the regulatory change, and wherein the questionnaire is configured to prompt the user dashboard to request a user input comprising a response to the questionnaire;

receive, from the user dashboard, the user input comprising the response to the questionnaire;

create a compliance action plan for the regulatory change, wherein the compliance action plan comprises one or more action steps that must be completed within a respective target date to account for the regulatory change and put the particular line of business within the enterprise in compliance with the regulatory change;

provide a compliance action plan interface to the user dashboard, wherein the compliance action plan interface manages a compliance policy of the enterprise, with regard to the regulatory change;

in response to creating the compliance action plan, automatically assign a first action step of the one or more action steps to a user dashboard of a user that has knowledge of the particular line of business affected by the regulatory change;

when the first action step is completed by the assigned user within its respective target date, remove the first action step from the compliance action plan; and when each remaining action step of the compliance action plan has been completed by the assigned user within each respective target date, transmit a notification to the assigned user dashboard, wherein the notification comprises an indication that the particular line of business is in compliance with the regulatory change.

2. The system of claim 1, wherein the executable software code configured to identify a first regulatory inventory affected by the regulatory change is further configured to identify at least a second regulatory inventory within the enterprise that is not affected by the regulatory change.

3. The system of claim 2, wherein the executable software code configured to communicate the regulatory change to the user dashboard associated with the first regulatory inventory is further configured to not communicate the regulatory change to at least a second user dashboard associated with the second regulatory inventory.

4. A computer implemented method for managing regulatory inventory and regulatory change for an enterprise, said computer implemented method comprising:

monitoring, via a processing device, at a managing server, regulatory change data from one or more electronic feeds within a distributed server network, wherein the electronic feeds monitor one or more issuing authorities, and wherein the one or more electronic feeds are transmitted from one or more remote servers in at least one geographic region that is separate from the managing server;

identifying, via a processing device, a regulatory change from the regulatory change data based on a citation taxonomy of the regulatory change data, wherein the regulatory change data is matched to a citation taxonomy of one or more regulatory inventories;

identifying, via a processing device, a regulatory inventory of the one or more regulatory inventories, wherein the regulatory inventory is affected by the regulatory change, and wherein the regulatory inventory is a set of laws, rules, and regulations that are relevant to a particular line of business within the enterprise;

communicating, via a processing device, the regulatory change to a user dashboard associated with the identified regulatory inventory;

providing, via a processing device, a questionnaire to the user dashboard, wherein the questionnaire comprises queries regarding whether processes, controls, policies, monitoring activities, or testing activities are affected by the regulatory change, and wherein the questionnaire is configured to prompt the user dashboard to request a user input comprising a response to the questionnaire;

receiving, via a processing device, from the user dashboard, the user input comprising the response to the questionnaire;

creating, via a processing device, a compliance action plan for the regulatory change, wherein the compliance action plan comprises one or more action steps that must be completed within a respective target date to account for the regulatory change and put the particular line of business within the enterprise in compliance with the regulatory change;

providing, via a processing device, a compliance action plan interface to the user dashboard, wherein the compliance action plan interface manages a compliance policy of the enterprise, with regard to the regulatory change;

in response to creating the compliance action plan, automatically assigning, via a processing device, a first action step of the one or more action steps to a user dashboard of a user that has knowledge of the particular line of business affected by the regulatory change;

when the first action step is completed by the assigned user within its respective target date, removing, via a processing device, the first action step from the compliance action plan; and when each remaining action step of the compliance action plan has been completed by the assigned user within each respective target date, transmitting, via a processing device, a notification to the assigned user dashboard, wherein the notification comprises an indication that the particular line of business is in compliance with the regulatory change.

5. The computer implemented method of claim 4, wherein the computer implemented method comprising identifying, via a processing device, a first regulatory inventory affected by the regulatory change is further configured to identify, via a processing device, at least a second regulatory inventory within the enterprise that is not affected by the regulatory change.

6. The computer implemented method of claim 5, wherein the computer implement method comprising communicating, via a processing device, the regulatory change to the user dashboard associated with the first regulatory inventory is further configured to not communicate the regulatory change to at least a second user dashboard associated with the second regulatory inventory.

7. A computer program product for managing regulatory inventory and regulatory change for an enterprise, the computer program product comprising a non-transitory computer readable medium comprising computer readable instructions, the instructions comprising instructions for:

monitoring, at a managing server, regulatory change data from one or more electronic feeds within a distributed server network, wherein the electronic feeds monitor one or more issuing authorities, and wherein the one or more electronic feeds are transmitted from one or more remote servers in at least one geographic region that is separate from the managing server;

identifying a regulatory change from the regulatory change data based on a citation taxonomy of the regulatory change data, wherein the regulatory change data is matched to a citation taxonomy of one or more regulatory inventories;

identifying a regulatory inventory of the one or more regulatory inventories, wherein the regulatory inventory is affected by the regulatory change, and wherein the regulatory inventory is a set of laws, rules, and regulations that are relevant to a particular line of business within the enterprise;

communicating the regulatory change to a user dashboard associated with the identified regulatory inventory;

providing a questionnaire to the user dashboard, wherein the questionnaire comprises queries regarding whether processes, controls, policies, monitoring activities, or testing activities are affected by the regulatory change, and wherein the questionnaire is configured to prompt the user dashboard to request a user input comprising a response to the questionnaire;

receiving, from the user dashboard, the user input comprising the response to the questionnaire;

creating a compliance action plan for the regulatory change, wherein the compliance action plan comprises one or more action steps that must be completed within a respective target date to account for the regulatory change and put the particular line of business within the enterprise in compliance with the regulatory change;

providing a compliance action plan interface to the user dashboard, wherein the compliance action plan interface manages a compliance policy of the enterprise, with regard to the regulatory change;

in response to creating the compliance action plan, automatically assigning a first action step of the one or more action steps to a user dashboard of a user that has knowledge of the particular line of business affected by the regulatory change;

when the first action step is completed by the assigned user within its respective target date, removing the first action step from the compliance action plan; and when each remaining action step of the compliance action plan has been completed by the assigned user within each respective target date, transmitting a notification to the assigned user dashboard, wherein the notification comprises an indication that the particular line of business is in compliance with the regulatory change.

8. The computer program product of claim 7, wherein the computer readable instructions comprising instructions for identifying a first regulatory inventory affected by the regulatory change further comprises instructions for identifying at least a second regulatory inventory within the enterprise that is not affected by the regulatory change.

9. The computer program product of claim 8, wherein the computer readable instructions comprising instructions for communicating the regulatory change to the user dashboard associated with the first regulatory inventory further comprises instructions for not communicating the regulatory change to at least a second user dashboard associated with the second regulatory inventory.

10. The system of claim 1, wherein the particular line of business to which the identified regulatory inventory is related comprises data security within the enterprise.

11. The computer implemented method of claim 4, wherein the particular line of business to which the identified regulatory inventory is related comprises data security within the enterprise.

12. The computer program product of claim 7, wherein the particular line of business to which the identified regulatory inventory is related comprises data security within the enterprise.

* * * * *